2 Sheets--Sheet 1.

J. L. GRAHAM & S. J. WALLACE.
Cultivators.

No. 157,125. Patented Nov. 24. 1874.

Witness:
Azem Holland
R. M. Marshall

Inventors:
Samuel Jacob Wallace,
John Lindsey Graham,
By Saml. J. Wallace,
Attorney.

2 Sheets--Sheet 2.
J. L. GRAHAM & S. J. WALLACE.
Cultivators.
No. 157,125. Patented Nov. 24, 1874.
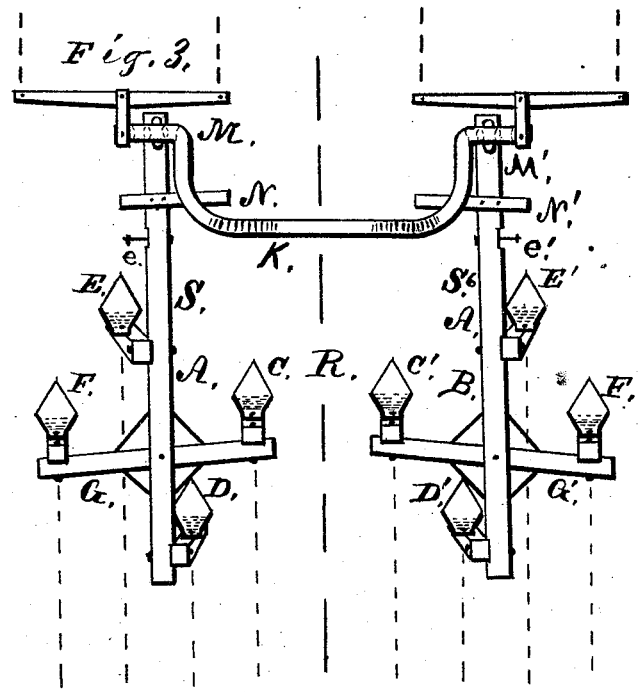
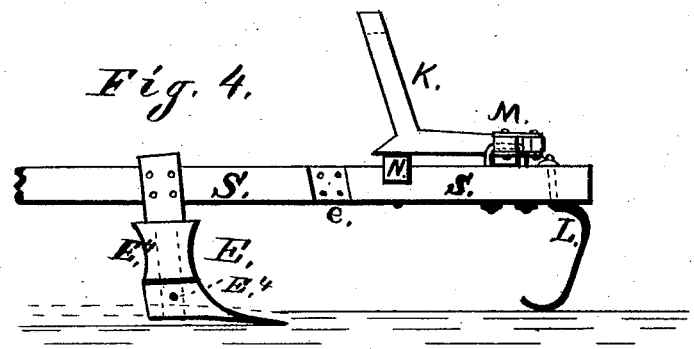
Witnesses:
A. Holland,
F. M. Tate.
Inventors:
Samuel Jacob Wallace,
John Lindsey Graham,
By Saml. J. Wallace,
Attorney.

UNITED STATES PATENT OFFICE.

JOHN L. GRAHAM, OF CARTHAGE, ILLINOIS, AND SAMUEL J. WALLACE, OF KEOKUK, IOWA.

IMPROVEMENT IN CULTIVATORS.

Specification forming part of Letters Patent No. 157,125, dated November 24, 1874; application filed December 1, 1873.

*To all whom it may concern:*

Be it known that we, JOHN LINDSAY GRAHAM, of Carthage, Hancock county, Illinois, and SAMUEL JACOB WALLACE, of Keokuk, Lee county, Iowa, U. S. A., have invented an Improvement in Cultivators, of which the following is a specification:

This invention relates to double or straddle-row cultivators for acting on both sides of a row of plants at one passage. It is made substantially as hereinafter set forth, referring to the accompanying drawings, in which—

Figure 1:
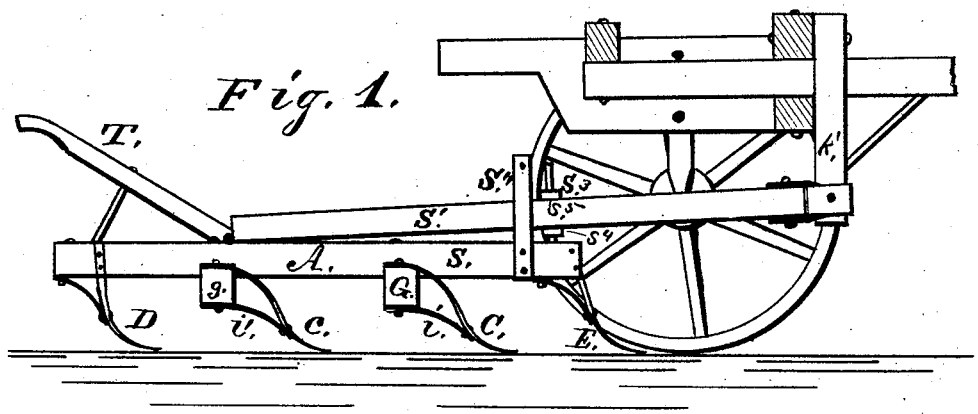
Figure 2:
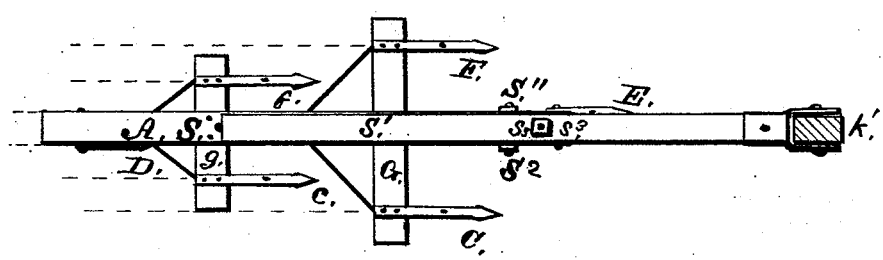

Figures 1 and 2 show side view and plan of one portion of the invention, together with part not belonging to this invention, designed to illustrate the latitude of use of which this portion of the invention is capable. Figs. 3 and 4 show plan and side view of the remainder of the invention, together with other illustrative parts, showing like latitude of use where the full invention is not desired.

The apparatus has two similar plow-frames, as in Figs. 1 and 2, arranged to run one on each side of a row of plants. Each frame has a central beam and cross-bars, G $g$, with plows E C F $cf$ D. These are arranged with plow E in front to open a central furrow and to straighten out any stalks, &c., plow C next to the row of plants, and plow F on the other side in the middle between the rows; plows $cf$ behind plows C F and nearer the center, and plow D in the center behind all to finish the space. Plows C $c$ F $f$ project forward from the tops of the cross-bars and downward with double curves, as shown in Fig. 1, so that trash catching on them will slide up and back over the tops to clear the plows. They have braces $i$ $i'$ from their under sides back to the lower sides of the bars to strengthen them. These braces may be adjusted in length by taking up or letting out at the joints with the plows or the bars to regulate the depth of running and inclinations of the plows. The frames and plows are set low, so they may be both strong and light and to avoid top-heaviness. This requires the provision for shedding trash over the tops of the side plows. The frames are guided by handles T. The beam S, to which the plows are attached, is hinged near its back end to top beam $S^1$, which reaches forward for the draft. This is held in line by guide $S''$, which leaves it free to move up and down. The plows have their points flat on the bottom, so they will run at regular depths. The depth is adjusted to any degree of niceness by bolt $S^3$, fixed in the lower beam, and adjustable in the upper by screw-nuts $S^4$ $S^5$. The higher the upper beam is set the deeper the plows will run. The plow-frames are connected and held a suitable distance apart by the arched yoke K, as shown in Figs. 3 and 4. This is attached to the beams at their front ends by joints or staple-like hinges M M', arranged to hold the beams in place and allow free rocking and sidewise motion of the frames with their plows to separately conform to the surface of the ground, together with a separate free lateral and vertical motion to each frame for guidance at work, while the frames are separately self-supporting on their broad and extended base of plows. The arched yoke K acts as a double-tree or evener between the two sides, and the single-trees for the horses are attached to its ends outside of the beams, to give some leverage to the horses, or they may be attached to the beams. Any suitable clevis may be used to connect the single-trees and regulate the depth of furrow. There are additional holes in yoke K for attaching the beams to vary their width apart. Yoke K bends backward from the points of attaching the beams and rests on cross-pieces N N'. It then rises into a bow or arch over the row of plants on line R. This prevents it tilting forward or back, as it would if freely jointed and rising in an arch directly from one beam across to the other. Or yoke K can be jointed to one beam without the vertical motion, so that it will be held up by one end and move with the beam on that side, while the other end retains the vertical motion, and allows both frames free separate motions vertically without the back bend of yoke K, and the cross-pieces N N' for it to rest on. Part L is pivoted in the end of the beam, and reaches down near the ground, to be used as a fulcrum in lifting the frames. The front plows E are arranged to be taken off and turned around and attached at $e$ $e'$, to be used as runners in moving from place to place. The front plow